United States Patent
Kumar et al.

(10) Patent No.: US 10,704,312 B2
(45) Date of Patent: Jul. 7, 2020

(54) DOOR ALIGNMENT SYSTEMS AND METHODS

(71) Applicant: THE BOEING COMPANY, Chicago, IL (US)

(72) Inventors: Guarav Kumar, Lynnwood, WA (US); Tesfaye Tsehayneh Ejigu, Lynnwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 396 days.

(21) Appl. No.: 15/830,548

(22) Filed: Dec. 4, 2017

(65) Prior Publication Data

US 2019/0169906 A1 Jun. 6, 2019

(51) Int. Cl.
*E05F 7/00* (2006.01)
*B64C 1/14* (2006.01)

(52) U.S. Cl.
CPC ............ *E05F 7/005* (2013.01); *B64C 1/1461* (2013.01); *B64C 1/1407* (2013.01); *E05Y 2900/132* (2013.01); *E05Y 2900/20* (2013.01)

(58) Field of Classification Search
CPC ...... E05F 7/005; B64C 1/1461; B64C 1/1407; B64D 2011/0046; E05Y 2900/132; E05Y 2900/20
See application file for complete search history.

(56) References Cited

U.S. PATENT DOCUMENTS

| | | | | | |
|---|---|---|---|---|---|
| 1,089,193 | A | * | 3/1914 | Ervien | E05F 7/005 292/15 |
| 5,052,151 | A | * | 10/1991 | Inui | E05D 15/502 292/304 |
| 2009/0152398 | A1 | * | 6/2009 | Risch | B64C 1/14 244/129.5 |
| 2016/0356078 | A1 | * | 12/2016 | Macaraeg, Jr. | E06B 3/362 |

* cited by examiner

*Primary Examiner* — Rodney A Bonnette
(74) *Attorney, Agent, or Firm* — The Small Patent Law Group LLC; Joseph M. Butscher (57) ABSTRACT

A door alignment system includes a first alignment member secured to one of a first door or a structure connected to the first door, and a second alignment member secured to the other of the first door or the structure. The first alignment member is configured to couple to the second alignment member when the first door is in a closed position relative to the structure in order to prevent the first door from binding in relation to the structure. The first alignment member is configured to be separated from the second alignment member when the first door is in an open position relative to the structure.

26 Claims, 7 Drawing Sheets

DOOR ALIGNMENT SYSTEMS AND METHODS

FIELD OF THE DISCLOSURE

Examples of the present disclosure generally relate to door alignment systems and methods, and, more particularly, to door alignment systems and methods that are configured to prevent or otherwise limit binding of one or more doors.

BACKGROUND OF THE DISCLOSURE

Doors are used to selectively close and open an area or space. For example, doors may be used to selectively open and close an area, such as a driveway, garage, road, and/or the like.

Similarly, various enclosures include doors that are moveably secured to housings. For example, a cabinet, closet, refrigerated compartment, lavatory, enclosed area, and/or the like onboard an aircraft may include one or more doors that are moveably secured to a housing, frame, and/or the like.

Typically, a gap exists between a door and a housing and/or another door. The gap provides a clearance area that allows the door(s) to open and close. However, as forces are applied to a structure that supports the door(s), portions of the doors may move towards another. For example, upper portions of the doors may tilt towards one another and interfere with each other, thereby resulting in binding, which may cause the door(s) to stick to one another and/or a housing. Such binding may make opening and closing of the door(s) difficult.

During a flight of an aircraft, loads are exerted into structures (such as monuments) within an internal cabin. The exerted loads may distort housing frames, and cause edges of doors to bind in relation to a housing and/or other doors. Accordingly, the doors may stick and not smoothly open and close.

Interior monument doors of an aircraft are routinely inspected to ensure smooth operation. If a door is found to be binding, one or more latches and/or tie rods are adjusted to alleviate the binding. As can be appreciated, the process of regularly inspecting doors for binding and adjusting latches and/or tie rods to alleviate any binding is time- and labor-intensive.

SUMMARY OF THE DISCLOSURE

A need exists for a system and method of automatically aligning a door with a housing and/or another door. Further, a need exists for a system and method of preventing or otherwise limiting door binding.

With those needs in mind, certain embodiments of the present disclosure provide a door alignment system that includes a first alignment member secured to one of a first door or a structure connected to the first door, and a second alignment member secured to the other of the first door or the structure. The first alignment member is configured to couple to the second alignment member when the first door is in a closed position relative to the structure in order to prevent the first door from binding in relation to the structure. The first alignment member is configured to be separated from the second alignment member when the first door is in an open position relative to the structure.

Certain embodiments of the present disclosure provide a vehicle that includes an internal cabin, and an enclosure within the internal cabin. The enclosure includes a housing defining an internal chamber, a door moveably secured to the housing between a closed position and an open position, and a door alignment system that prevents the door from binding in relation to the housing. The internal chamber is closed when the door is in the closed position, and exposed when the door is in the open position.

In at least one embodiment, the first alignment member is mounted on a first internal surface of the door. The second alignment member is mounted on a second internal surface of a lateral wall of the housing. The first internal surface of the door may be orthogonal to the second internal surface of the lateral wall when the door is in the closed position.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps.

Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Examples of the present disclosure provide a door alignment system that is configured to align a door of an enclosure, such as monument, in relation to a housing or frame and/or another door. The monument is a structural component, such as a lavatory, galley, cockpit, or the like, within an internal cabin of an aircraft. Optionally, the enclosure may be a closet, cabinet, refrigerated compartment, oven, or the like, such as within an internal cabin of an aircraft. Also, optionally, the door alignment system may be used with doors that are not necessarily associated with an enclosure. For example, the door alignment system may be used with doors, such as gates, moveably coupled to posts, columns, and/or the like, which are positioned at an entrance of a particular location, such as a driveway, garage, road, and/or the like.

In at least one embodiment, the door alignment system includes a first alignment assembly or member coupled to a door, and a second alignment assembly or member coupled to another door or a fixed structure (such as a housing, frame, post, and/or the like). The first and second alignment members are configured to align the door(s) in relation to one another and/or the fixed structure in order to prevent or otherwise limit binding.

In at least one embodiment, one of the first and second alignment members includes a door tap coupled to the door and the other includes a slot fixture mounted to the fixed structure and/or other door. The first alignment member may be orthogonal to the second alignment member (for example, offset by 90 degrees). A door tap is a component that is secured to a door or another structure that prevents, minimizes, or otherwise reduces one or more doors from binding.

The first and second alignment members cooperate to align one or more doors to reduce door binding, such as within an internal cabin of an aircraft.

Figure 1:
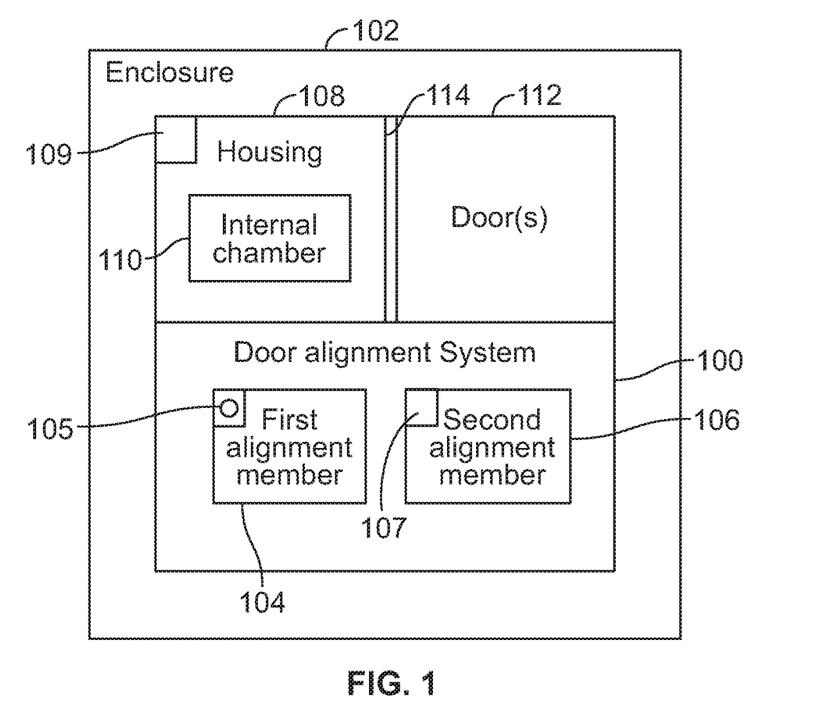
FIG. 1 illustrates a block diagram of a door alignment system of an enclosure, according to an embodiment of the present disclosure.

FIG. 1 illustrates a block diagram of a door alignment system 100 of an enclosure 102, according to an embodiment of the present disclosure. The door alignment system 100 includes a first alignment member 104 and a second alignment member 106. The first alignment member 104 and the second alignment member 106 are separable and are configured to prevent or otherwise limit door binding of the enclosure 102. In a closed position, the first alignment member 104 is coupled to the second alignment member 106. In an open position, the first alignment member 104 is separated (for example, uncoupled) from the second alignment member 106.

The enclosure 102 may be a monument or other such structure within an aircraft. For example, the enclosure 102 may be a lavatory, galley, cockpit, or the like within the aircraft. As another example, the enclosure 102 may be a closet, cabinet, refrigerated compartment, oven, or the like, such as within the aircraft.

The enclosure 102 includes a housing 108 that defines an internal chamber 110. One or more doors 112 are moveably coupled to the housing 108 in order to selectively open and close the internal chamber 110. For example, the door(s) 112 are pivotally coupled to the housing 108 through one or more hinges 114, which allow the door(s) to be pivotally moved between open and closed positions. When the door(s) 112 is in the closed position, the first alignment member 104 is coupled to the second alignment member 106. When the door(s) 112 is in the open position, the first alignment member 104 is separated from the second alignment member 106.

In at least one other embodiment, the door alignment system 100 may be used with one or more door(s) 112 that are not part of an enclosure. In this embodiment, the housing 108 may be a fixed structure 109, such as a post, frame, or the like at a boundary of an area, such as a road, driveway, or the like.

The first alignment member 104 is secured to the door(s) 112. The second alignment member 106 is secured to another door(s) 112 or the housing 108. The first alignment member 104 and the second alignment member 106 are coupled together with the door(s) 112 in the closed position, and separated from one another when the door(s) 112 is in the open position. The first alignment member 104 and the second alignment member 106 are configured to align the door(s) 112 with respect to one another door 112 and/or the housing 108 to prevent the door(s) 112 from binding.

In at least one embodiment, the first alignment member 104 is a door tap 105, and the second alignment member 106 is a slot fixture 107. In at least one other embodiment, the first alignment member 104 and the second alignment member 106 are both door taps. As another example, the first alignment member 104 is or includes a protuberance (such as a tab, pin, stud, nub, or the like), and the second alignment member 106 is or includes a receptacle (such as a slot, hole, opening, or the like formed in a structure) that is configured to receive and retain the protuberance. As another example, the first alignment member 104 is or includes a plunger, and the second alignment member 106 is or includes a protuberance that is configured to removably couple to the plunger.

Figure 2:
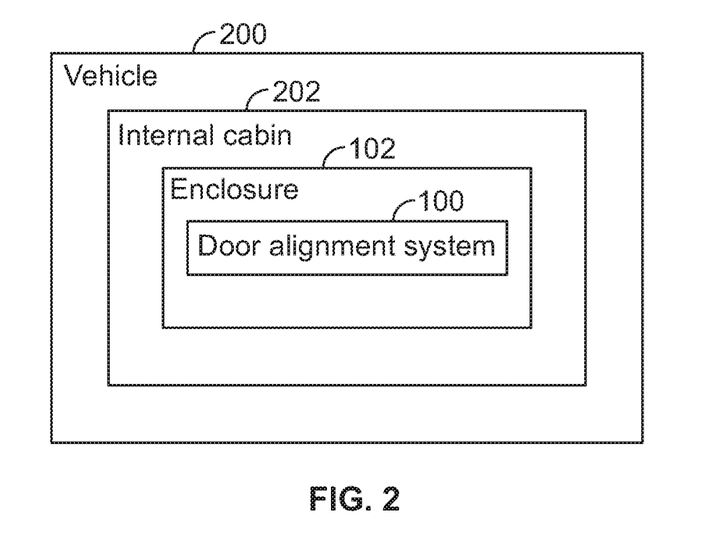
FIG. 2 illustrates a block diagram of a vehicle including an enclosure having a door alignment system within an internal cabin, according to an embodiment of the present disclosure.

FIG. 2 illustrates a block diagram of a vehicle 200 including the enclosure 102 having the door alignment system 100 within an internal cabin 202, according to an embodiment of the present disclosure. The vehicle 200 may be a commercial aircraft, for example. Optionally, the vehicle 200 may be another type of aircraft, a land-based vehicle (such as an automobile, truck, bus, train, or the like), a water-based vehicle (such as a boat), or a spacecraft. The enclosure 102 may be a monument within the internal cabin 202. Optionally, the enclosure 102 may be a cabinet, closet, bin, refrigerated compartment, or the like within the internal cabin 202.

The door alignment system 100 may be part of the enclosure 102. Optionally, the door alignment system 100 may be used with doors that are not part of an enclosure. Also, optionally, the door alignment system 100 may be used with applications other than vehicles, as noted.

Figure 3:
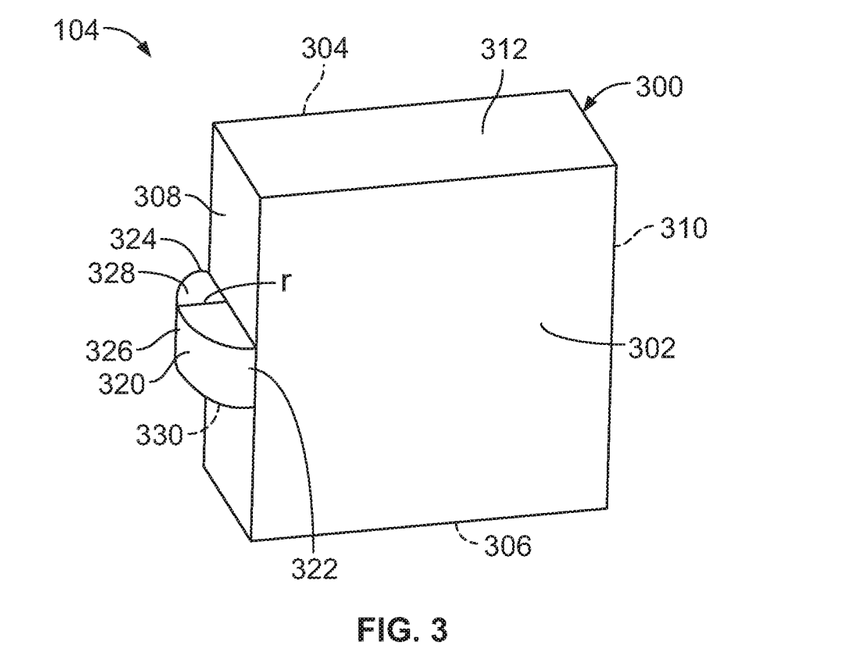
FIG. 3 illustrates a perspective view of a first alignment member, according to an embodiment of the present disclosure.

FIG. 3 illustrates a perspective view of a first alignment member 104, according to an embodiment of the present disclosure. The first alignment member as shown in FIG. 3 is an example of a door tap. In at least one embodiment, the first alignment member 104 includes a main body 300 having a front wall 302 connected to an opposite rear wall 304 through a lower edge 306, a first lateral edge 308, an opposite second lateral edge 310, and an upper edge 312. As shown, the main body 300 may be generally cubic or cuboid-shaped. Optionally, the main body 300 may be shaped differently than shown.

A coupling nub 320 outwardly extends from the first lateral edge 308. The coupling nub 320 may be located at a middle section of the first lateral edge 308 and may connect to the front wall 302 and the rear wall 304. The coupling nub includes a first end 322 proximate to the front wall 302 and a second end 324 proximate to the rear wall 304. The first end 322 connects to the second end 324 through a rounded outer surface 326, which may have a constant radius r. As such, the coupling nub 320 may be a semi-circular protuberance extending from the first lateral edge 308. An upper surface 328 and a lower surface 330 of the coupling nub 320 may be flat surfaces that may generally be parallel with the lower edge 306 and the upper edge 312. In at least one embodiment, the coupling nub 320 is formed unitarily with the first alignment member 104.

Figure 4:
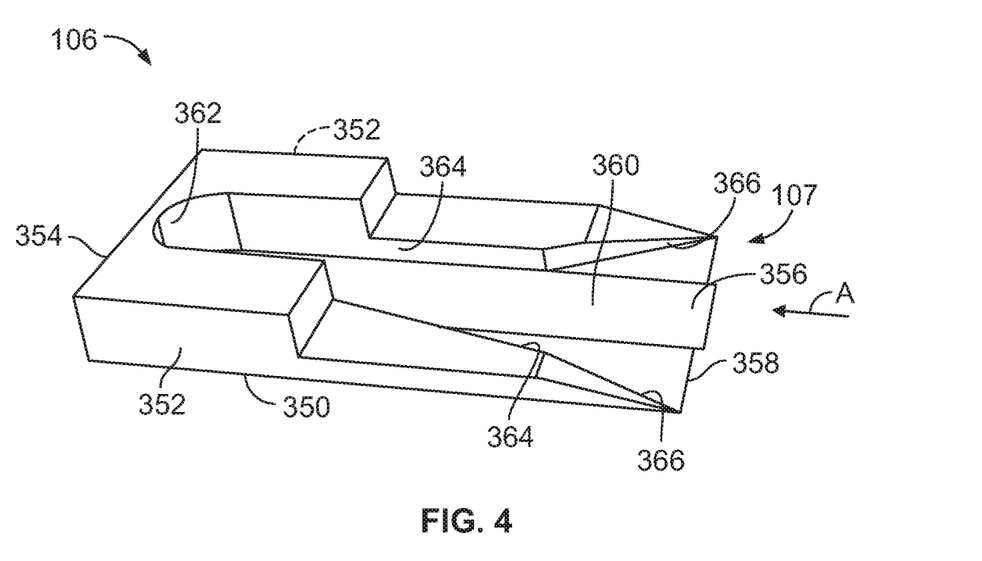
FIG. 4 illustrates a perspective view of a second alignment member, according to an embodiment of the present disclosure.

FIG. 4 illustrates a perspective view of a second alignment member 106, according to an embodiment of the present disclosure. The second alignment member 106 as shown in FIG. 4 is an example of a slot fixture. The second alignment member 106 includes a base 350. Lateral walls 352 and a rear wall 354 upwardly extend from the base 350. A nub-receiving inlet 356 is formed at a front end 358 opposite from the rear wall 354. The nub-receiving inlet 356 connects to a nub channel 360 that extends from the nub-receiving inlet 356 to a rounded internal surface 362 of the rear wall 354. The nub channel 360 is defined by the rounded internal surface 362 of the rear wall 354, and internal surfaces 364 of the lateral walls 352. The internal surfaces 364 of the lateral walls 352 may outwardly flare proximate to the nub-receiving inlet 356 to form lead-in guides 366. The lead-in guides 366 are configured to receive the coupling nub 320 (shown in FIG. 3) and lead the coupling nub 320 into a centered position within the nub channel 360 as the coupling nub 320 is moved into the nub-receiving inlet 356 and the nub channel 360 in the direction of arrow A.

Figure 5:
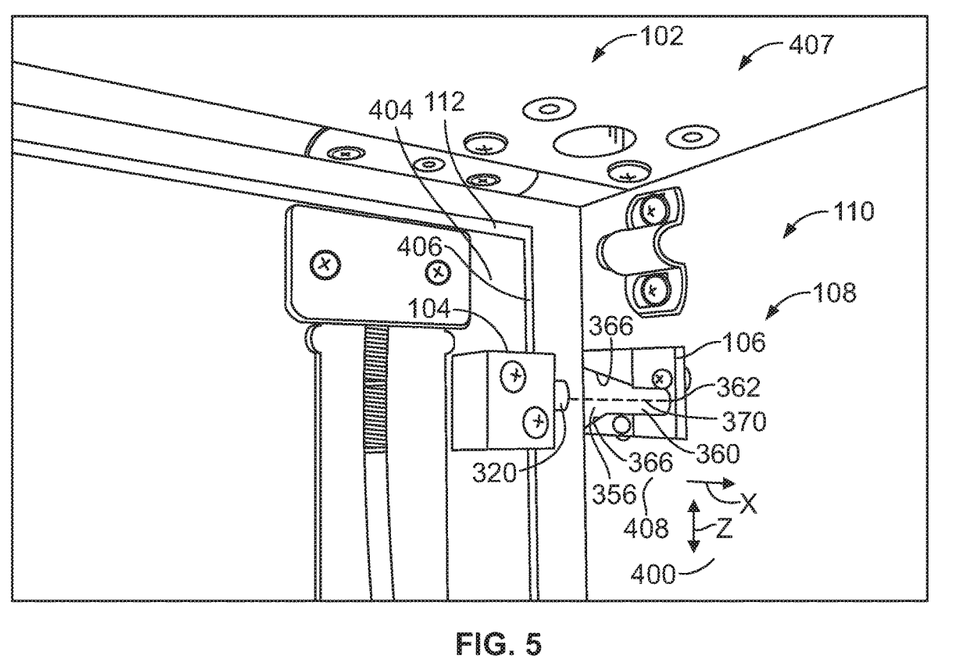
FIG. 5 illustrates a perspective internal view of an enclosure having a door in an open position in relation to a housing, according to an embodiment of the present disclosure.

FIG. 5 illustrates a perspective internal view of an enclosure 102 having a door 112 in an open position in relation to a housing 108, according to an embodiment of the present disclosure. In this embodiment, the housing 108 includes a lateral wall 400 connected to a top wall 402.

Referring to FIGS. 3 and 5, the first alignment member 104 is secured to an internal surface 404 proximate to a lateral edge 406 that is distally located from a hinge, such as the hinge 114 shown in FIG. 1. The rear wall 304 is mounted onto the internal surface 404 such that the coupling nub 320 is oriented towards the lateral edge 406. The first alignment member 104 is secured to the door 112, such as through fasteners (such as screws or bolts), adhesives, and/or the like. The coupling nub 320 may not extend outwardly past the lateral edge 406. Instead, the coupling nub 320 may be inwardly offset from the lateral edge 406.

The coupling nub 320 is pivotally aligned with the nub-receiving inlet 356 of the second alignment member 106, which is secured to an internal surface 408 of the lateral wall 400. Referring to FIGS. 4 and 5, the base 350 of the second alignment member 106 is secured onto the internal surface 408. The second alignment member 106 is secured to the housing 108, such as through fasteners (such as screws or bolts), adhesives, and/or the like.

Referring to FIGS. 3-5, in operation, as the door 112 is pivoted into a closed position in relation to the housing 108, the coupling nub 320 of the first alignment member 104 moves into the nub-receiving inlet 356 of the second alignment member 106. With continued closing motion, one or both of the lead-in guides 366 of the second alignment member 106 urge the coupling nub 320 towards a central longitudinal axis 370 of the nub channel 360, and therefore properly orient the door 112 in relation to a Z-axis. As the door 112 continues to be closed, the coupling nub 320 abuts into the rounded internal surface 362, which halts further motion of the first alignment member 104 relative to the second alignment member 106, thereby properly orienting the door 112 in relation to an X-axis, which is orthogonal to the Z-axis. In this manner, the first alignment member 104 and the second alignment member 106 cooperate with one another to orient and align the door 112 in relation to the housing 108 so as to prevent or otherwise limit binding therebetween. When the door 112 is in the closed position, the first alignment member 104 may cooperate with the second alignment member 106 to maintain a gap between the door 112 and the housing 108 that prevents or otherwise limits binding.

Figure 6:
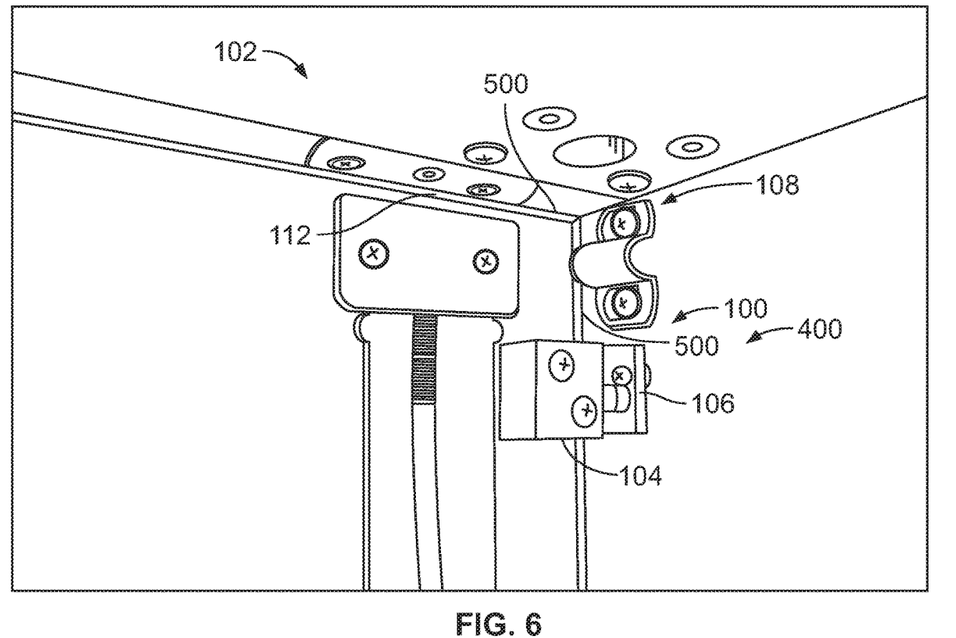
FIG. 6 illustrates a perspective internal view of an enclosure having a door in a closed position in relation to a housing, according to an embodiment of the present disclosure.

FIG. 6 illustrates a perspective internal view of the enclosure 102 having the door 112 in the closed position in relation to the housing 108. The door alignment system 100 including the first alignment member 104 and the second alignment member 106 ensures that a uniform separation gap 500 is formed between the door 112 and the housing 108 in order to prevent the door 112 from binding in relation to the housing 108.

As shown, when the door 112 is closed, the first alignment member 104 may be orthogonally oriented with respect to the second alignment member 106. In particular, the first alignment member 104 is secured to the closed door 112, which may generally be perpendicular to the lateral wall 400, onto which the second alignment member 106 is mounted.

Optionally, the first alignment member 104 may be secured to the lateral wall 400 of the housing 108, while the second alignment member 106 is secured to the door 112. In at least one other embodiment, the first and second alignment member 104 and 106 may both be located proximate to outer lateral edges of doors 112 that are configured to open and close relative to one another, instead of one of the first and second alignment member 104 and 106 being secured to a fixed portion of a structure.

Figure 7:
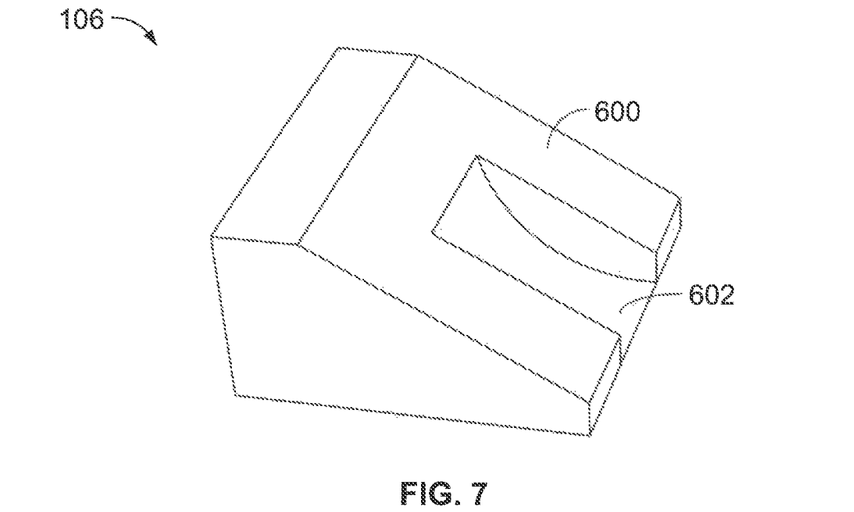
FIG. 7 illustrates a perspective view of a second alignment member, according to an embodiment of the present disclosure.

FIG. 7 illustrates a perspective view of a second alignment member 106, according to an embodiment of the present disclosure. In this embodiment, the second alignment member 106 includes a ramped surface 600. A nub recess 602 is formed within the ramped surface 600. The nub recess 602 may be sized and shaped so as to allow at least a portion of the coupling nub 320 (shown in FIG. 3) to be received therein. The nub recess 602 may or may not include lead-in features. The second alignment member 106 shown in FIG. 7 may be used in place of the second alignment member 106 shown in FIGS. 4-6.

Figure 8:
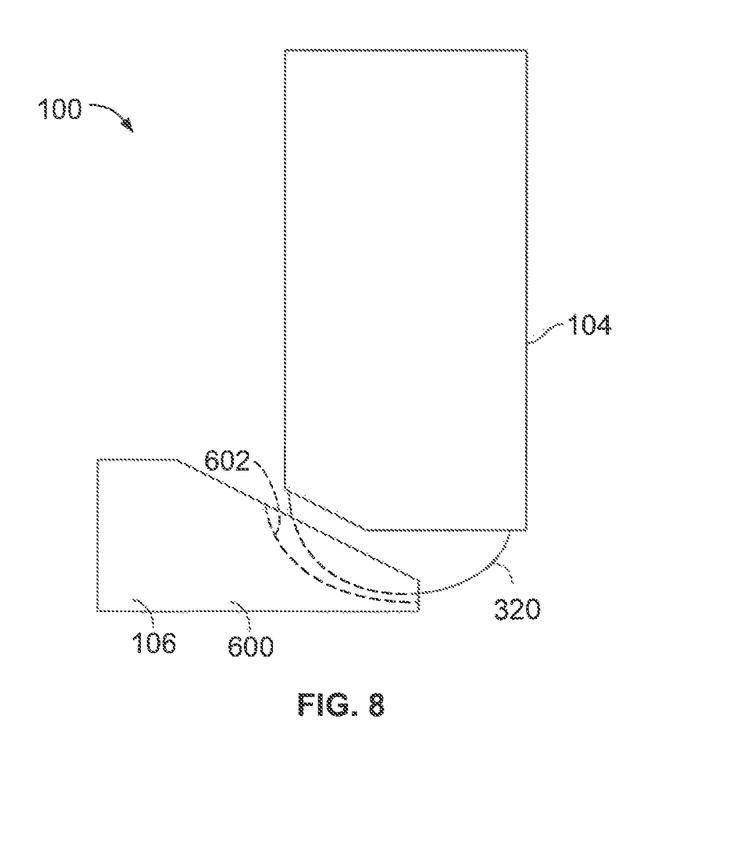
FIG. 8 illustrates a top view of a door alignment system, according to an embodiment of the present disclosure.

FIG. 8 illustrates a top view of a door alignment system 100, according to an embodiment of the present disclosure. The door alignment system 100 shown in FIG. 8 includes the first alignment member 104 shown in FIG. 3 and the second alignment member 106 shown in FIG. 7. As shown, in the closed position, a portion of the coupling nub 320 is retained within the nub recess 602.

Figure 9:
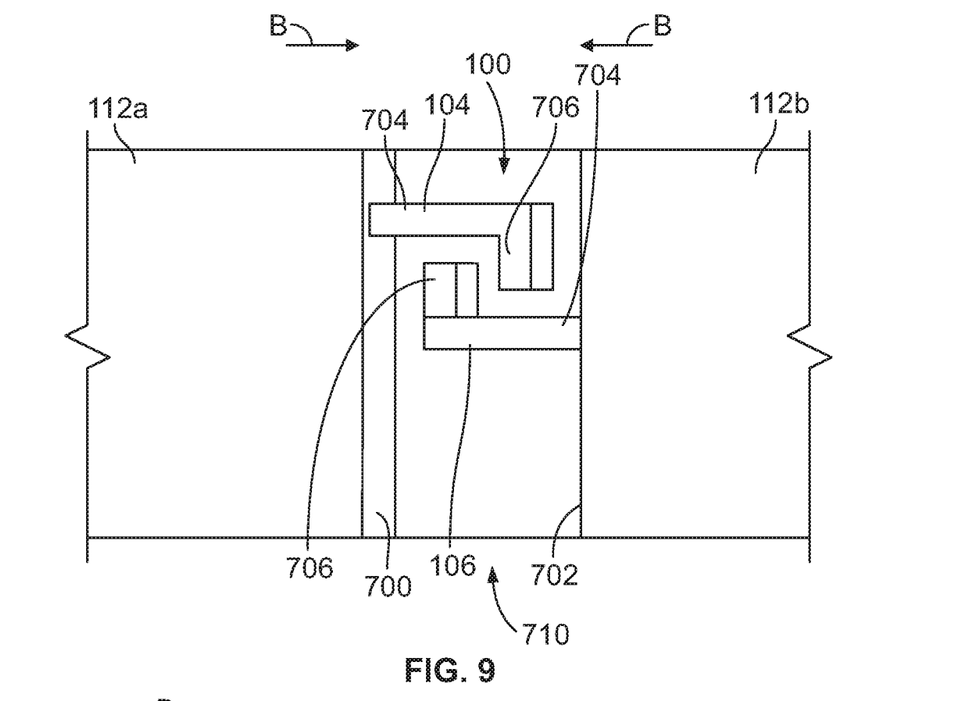
FIG. 9 illustrates a perspective front view of a door alignment system in relation to a first door and a second door, according to an embodiment of the present disclosure.

FIG. 9 illustrates a perspective front view of a door alignment system 100 in relation to a first door 112a and a second door 112b, according to an embodiment of the present disclosure. In this embodiment, the door alignment system 100 includes a first alignment member 104 outwardly extending from a lateral edge 700 that is distally located from a pivot axis of a hinge of the door 112a, and a second alignment member 106 outwardly extending from a lateral edge 702 that is distally located from a pivot axis of a hinge of the door 112b. The first and second alignment member 104 and 106 may be L-shaped taps.

For example, each of the first and second alignment members 104 and 106 includes a linear extension beam 704 that connects to an orthogonal ledge 706. The ledges 706 of each of the first and second alignment members 104 and 106 are oriented towards the extension beams 704 of the other of the first and second alignment members 104 and 106.

To the extent that the doors 112a and 112b may be urged towards one another in the directions or arrows B, outer surfaces of the ledges 706 abut into the lateral edges 700 and 702 to maintain a separation gap 710 between the doors 112a and 112b. Further, if the doors 112a and 112 shift in an opposite direction from arrows B, internal surfaces of the ledges 706 catch on one another to maintain the separation gap 710.

While the first and second alignment members 104 and 106 of FIG. 9 are shown on doors 112a and 112b, one of the first or second alignment members 104 and 106 may alternatively be mounted on a fixed structure, such as a wall of a housing.

Figure 10:
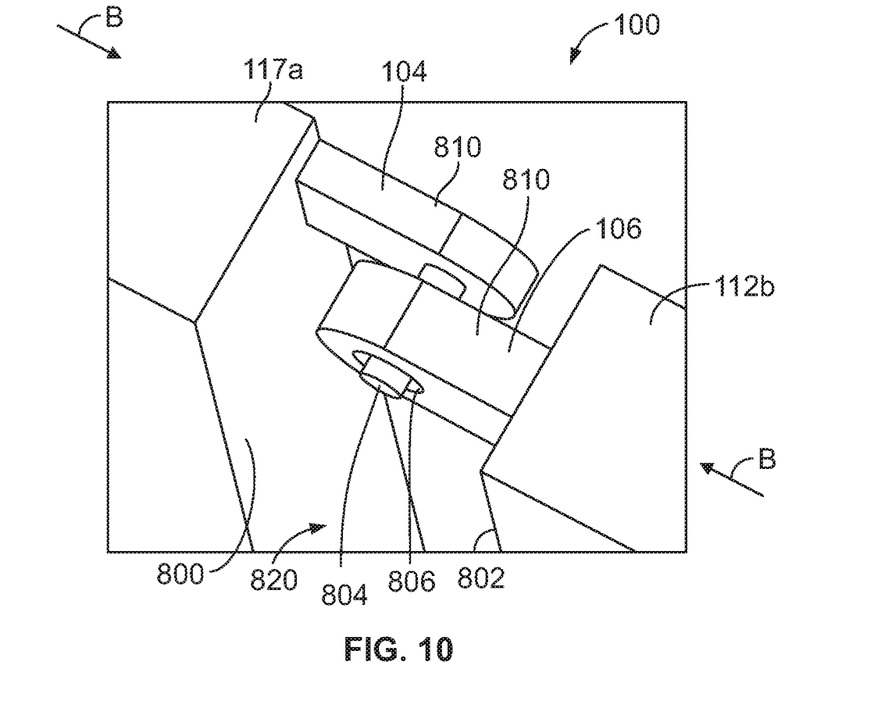
FIG. 10 illustrates a perspective top view of a door alignment system in relation a first door and a second door, according to an embodiment of the present disclosure.

FIG. 10 illustrates a perspective top view of a door alignment system 100 in relation a first door 112a and a second door 112b, according to an embodiment of the present disclosure. In this embodiment, the door alignment system 100 includes a first alignment member 104 outwardly extending from a lateral edge 800 that is distally located from a pivot axis of a hinge of the door 112a, and a second alignment member 106 outwardly extending from a lateral edge 802 that is distally located from a pivot axis of a hinge of the door 112b. The first alignment member 104 includes a protuberance 804 (such as a cylindrical post or pin) that is configured to be received and retained within a receptacle 806 (such as a hole having a greater diameter than the protuberance) of the second alignment member 106 when the doors 112a and 112b are closed.

For example, each of the first and second alignment members 104 and 106 includes a linear extension beam 810, which may be offset and parallel from one another when the doors 112a and 112b are closed. The protuberance 804 extends from the beam 810 of the first alignment member 104, while the receptacle 806 is formed in the beam 810 of the second alignment member 106. To the extent that the doors 112a and 112b may be urged towards one another in the directions or arrows B (or in an opposite direction), the coupling of the first and second alignment members 104 and 106 by the protuberance 804 within the receptacle 806 maintains a separation gap 820 between the doors 112a and 112b and prevents or otherwise limits binding between the doors 112 and 112b.

While the first and second alignment members 104 and 106 of FIG. 10 are shown on doors 112a and 112b, one of the first or second alignment members 104 and 106 may alternatively be on a fixed structure, such as a wall of a housing.

Figure 11:
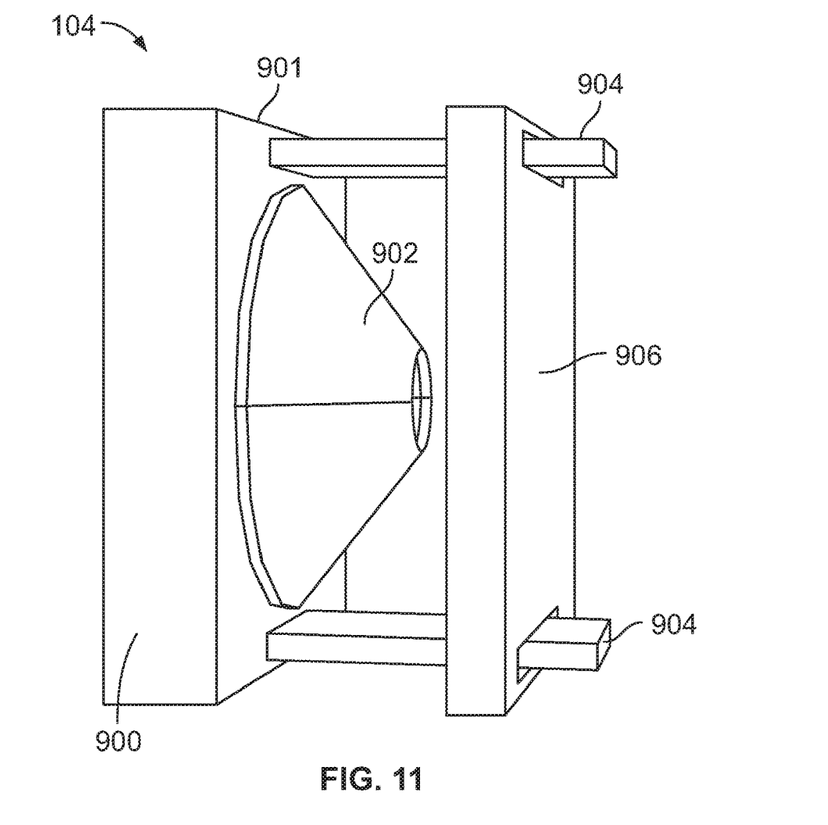
FIG. 11 illustrates a perspective view of a first alignment member, according to an embodiment of the present disclosure.

FIG. 11 illustrates a perspective view of a first alignment member, 104 according to an embodiment of the present disclosure. The first alignment member 104 shown in FIG. 11 may be secured to a door or a fixed structure, as described herein. The first alignment member 104 may be a plunger 900 including a base 901 having a spring 902 secured thereto, brackets 904 extending from the base 901, and a plate 906 moveably coupled to the brackets 904. The plate 906 is configured to translate over the brackets 904 towards and away from the spring 902. The spring 902 may be a Belleville spring.

Figure 12:
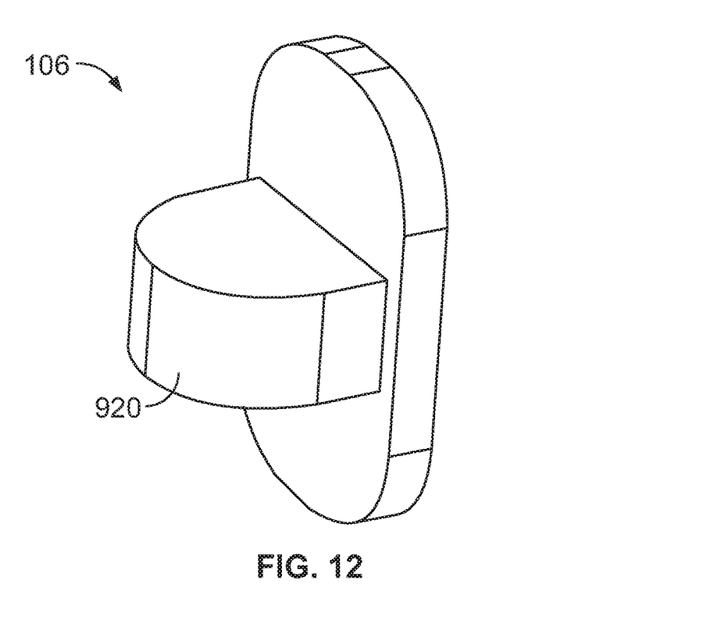
FIG. 12 illustrates a perspective view of a second alignment member, according to an embodiment of the present disclosure.

FIG. 12 illustrates a perspective view of a second alignment member 106, according to an embodiment of the present disclosure. The second alignment member 106 shown in FIG. 12 may be secured to a door or a fixed structure, as described herein. The second alignment member 106 may include a protuberance 920 that is configured to removably couple to the plunger 900 shown in FIG. 11. The protuberance 920 may be a nub, as described herein.

Referring to FIGS. 11 and 12, when the first alignment member 104 couples to the second alignment member 106 (such as when a door is closed), the protuberance 920 abuts into the plate 906. The force exerted by the protuberance 920 into the plate 906 may cause the plate 906 to move into the spring 902. The spring 902 exerts a resistive force into an opposite surface of the plate 906, thereby urging the plate 906 away from the base 901. In this manner, the first and second alignment members 104 and 106 may be used to prevent or otherwise limit door binding, as described herein.

Figure 13:
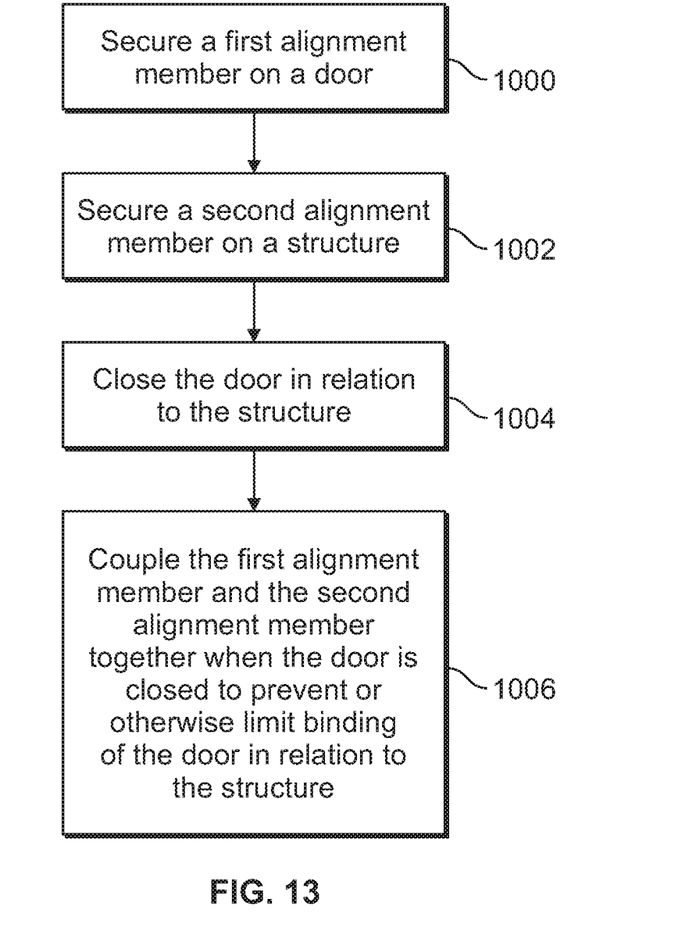
FIG. 13 illustrates a flow chart of a method of aligning a door with respect to a structure, according to an embodiment of the present disclosure.

FIG. 13 illustrates a flow chart of a method of aligning a door with respect to a structure, according to an embodiment of the present disclosure. The method beings at 1000, at which a first alignment member is secured on a door. At 1002, a second alignment member is secured on a structure, such as a housing of an enclosure or another door. At 1004, the door is closed in relation to the structure. At 1006, the first alignment member couples to the second alignment member when the door is closed to prevent or otherwise limit binding of the door in relation to the structure.

Referring to FIGS. 1-13, as described herein, embodiments of the present disclosure provide systems and methods of automatically aligning a door with a housing and/or another door. Further, embodiments of the present disclosure provide systems and methods of preventing or otherwise limiting door binding.

It is to be understood that the terms first and second in relation to the alignment members are merely to indicate a number of alignments within the door alignment system. The first alignment member may optionally be the second alignment member, and vice versa.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A door alignment system, comprising:
a first alignment member secured to one of a first door or a structure connected to the first door, wherein the first alignment member comprises a main body, and a coupling nub outwardly extending from a portion of the main body, wherein the coupling nub has a rounded outer surface; and
a second alignment member secured to the other of the first door or the structure, wherein the first alignment member is configured to couple to the second alignment member when the first door is in a closed position relative to the structure in order to prevent the first door from binding in relation to the structure, and wherein the first alignment member is configured to be separated from the second alignment member when the first door is in an open position relative to the structure, wherein the second alignment member comprises lateral walls and a rear wall extending from a base, wherein a nub-receiving inlet is formed at a front end opposite from the rear wall, wherein the nub-receiving inlet connects to a nub channel that extends from the nub-receiving inlet to a rounded internal surface of the rear wall, wherein the nub channel is defined by the rounded internal surface of the rear wall, and internal surfaces of the lateral walls, wherein the internal surfaces of the lateral walls outwardly flare proximate to the nub-receiving inlet to form lead-in guides, wherein the lead-in guides are configured to receive the coupling nub and lead the coupling nub into a centered position within the nub channel as the coupling nub is moved into the nub-receiving inlet and the nub channel.

2. The door alignment system of claim 1, wherein the structure is a housing defining an internal chamber, wherein the first door is configured to be moved between the closed position and the open position, wherein the internal chamber is closed when the door is in the closed position, and wherein the internal chamber is exposed when the door is in the open position.

3. The door alignment system of claim 1, wherein the structure is a second door.

4. The door alignment system of claim 1, wherein the structure is within an internal cabin of a vehicle.

5. The door alignment system of claim 1, wherein the first alignment member is a door tap, and wherein the second alignment member is a slot fixture.

6. The door alignment system of claim 1, wherein the first alignment member is configured to cooperate with the second alignment member to maintain a gap between the first door and the structure when the first door is in the closed position.

7. A vehicle comprising:
an internal cabin;
an enclosure within the internal cabin, wherein the enclosure comprises a housing defining an internal chamber, a door moveably secured to the housing between a closed position and an open position, and a door alignment system that prevents the door from binding in relation to the housing, wherein the internal chamber is closed when the door is in the closed position, and wherein the internal chamber is exposed when the door is in the open position, wherein the door alignment system comprises:
a first alignment member secured to one of the door or the housing, wherein the first alignment member comprises a main body, and a coupling nub outwardly extending from a portion of the main body, wherein the coupling nub has a rounded outer surface; and
a second alignment member secured to the other of the door or the housing, wherein the first alignment member is configured to couple to the second alignment member when the door is in the closed position relative to the housing in order to prevent the door from binding in relation to the housing, and wherein the first alignment member is configured to be separated from the second alignment member when the door is in the open position relative to the housing, wherein the second alignment member comprises lateral walls and a rear wall extending from a base, wherein a nub-receiving inlet is formed at a front end opposite from the rear wall, wherein the nub-receiving inlet connects to a nub channel that extends from the nub-receiving inlet to a rounded internal surface of the rear wall, wherein the nub channel is defined by the rounded internal surface of the rear wall, and internal surfaces of the lateral walls, wherein the internal surfaces of the lateral walls outwardly flare proximate to the nub-receiving inlet to form lead-in guides, wherein the lead-in guides are configured to receive the coupling nub and lead the coupling nub into a centered position within the nub channel as the coupling nub is moved into the nub-receiving inlet and the nub channel.

8. The vehicle of claim 7, wherein the first alignment member is a door tap, and wherein the second alignment member is a slot fixture.

9. The vehicle of claim 7, wherein the first alignment member is configured to cooperate with the second alignment member to maintain a gap between the door and the housing when the door is in the closed position.

10. The vehicle of claim 7, wherein the first alignment member is mounted on a first internal surface of the door, wherein the second alignment member is mounted on a second internal surface of a lateral wall of the housing.

11. The vehicle of claim 10, wherein the first internal surface of the door is orthogonal to the second internal surface of the lateral wall when the door is in the closed position.

12. A door alignment system, comprising:
a first alignment member secured to one of a first door or a structure connected to the first door, wherein the first alignment member is a first door tap; and
a second alignment member secured to the other of the first door or the structure, wherein the second alignment member is a second door tap, wherein the first alignment member is configured to couple to the second alignment member when the first door is in a closed position relative to the structure in order to prevent the first door from binding in relation to the structure, and wherein the first alignment member is configured to be separated from the second alignment member when the first door is in an open position relative to the structure.

13. The door alignment system of claim 12, wherein the structure is a housing defining an internal chamber, wherein the first door is configured to be moved between the closed position and the open position, wherein the internal chamber is closed when the door is in the closed position, and wherein the internal chamber is exposed when the door is in the open position.

14. The door alignment system of claim 12, wherein the structure is a second door.

15. The door alignment system of claim 12, wherein the structure is within an internal cabin of a vehicle.

16. The door alignment system of claim 12, wherein the first alignment member is configured to cooperate with the second alignment member to maintain a gap between the first door and the structure when the first door is in the closed position.

17. The door alignment system of claim 12, wherein each of the first alignment member and the second alignment member are L-shaped taps.

18. A vehicle comprising:
an internal cabin;
an enclosure within the internal cabin, wherein the enclosure comprises a housing defining an internal chamber, a door moveably secured to the housing between a closed position and an open position, and a door alignment system that prevents the door from binding in relation to the housing, wherein the internal chamber is closed when the door is in the closed position, and wherein the internal chamber is exposed when the door is in the open position, wherein the door alignment system comprises:
a first alignment member secured to one of the door or the housing, wherein the first alignment member is mounted on a first internal surface of the door; and
a second alignment member secured to the other of the door or the housing, wherein the second alignment member is mounted on a second internal surface of a lateral wall of the housing, wherein the first alignment member is configured to couple to the second alignment member when the door is in the closed position relative to the housing in order to prevent the door from binding in relation to the housing, wherein the first internal surface of the door is orthogonal to the second internal surface of the lateral wall when the door is in the closed position, and wherein the first alignment member is configured to be separated from the second alignment member when the door is in the open position relative to the housing.

19. The vehicle of claim 18, wherein the first alignment member is a door tap, and wherein the second alignment member is a slot fixture.

20. The vehicle of claim 18, wherein the first alignment member comprises:
a main body; and
a coupling nub outwardly extending from a portion of the main body, wherein the coupling nub has a rounded outer surface.

21. The vehicle of claim 20, wherein the second alignment member comprises lateral walls and a rear wall extending from a base, wherein a nub-receiving inlet is formed at a front end opposite from the rear wall, wherein the nub-receiving inlet connects to a nub channel that extends from the nub-receiving inlet to a rounded internal surface of the rear wall, wherein the nub channel is defined by the rounded internal surface of the rear wall, and internal surfaces of the lateral walls, wherein the internal surfaces of the lateral walls outwardly flare proximate to the nub-receiving inlet to form lead-in guides, wherein the lead-in guides are configured to receive the coupling nub and lead the coupling nub into a centered position within the nub channel as the coupling nub is moved into the nub-receiving inlet and the nub channel.

22. The vehicle of claim 20, wherein the second alignment member comprises a ramped surface, wherein a nub recess is formed within the ramped surface, wherein the nub recess is sized and shaped so as to allow at least a portion of the coupling nub to be received therein.

23. The vehicle of claim 18, wherein the first alignment member is configured to cooperate with the second alignment member to maintain a gap between the door and the housing when the door is in the closed position.

24. The vehicle of claim 18, wherein each of the first alignment member and the second alignment member are L-shaped taps.

25. The vehicle of claim 18, wherein the first alignment member comprises a protuberance, and wherein the second alignment member comprises a receptacle that receives and retains the protuberance when the first alignment member is coupled to the second alignment member.

26. The vehicle of claim 18, wherein the first alignment member comprises:
a base having a spring secured thereto;
brackets extending from the base; and
a plate moveably coupled to the brackets, wherein the plate is configured to move over the brackets towards and away from the spring,
and wherein the second alignment member comprises a protuberance.

* * * * *